Nov. 4, 1958    B. C. CRITTENDON    2,859,404
DEVICE FOR MEASURING STABILITY OF WATER-IN-OIL EMULSION
Filed May 23, 1955
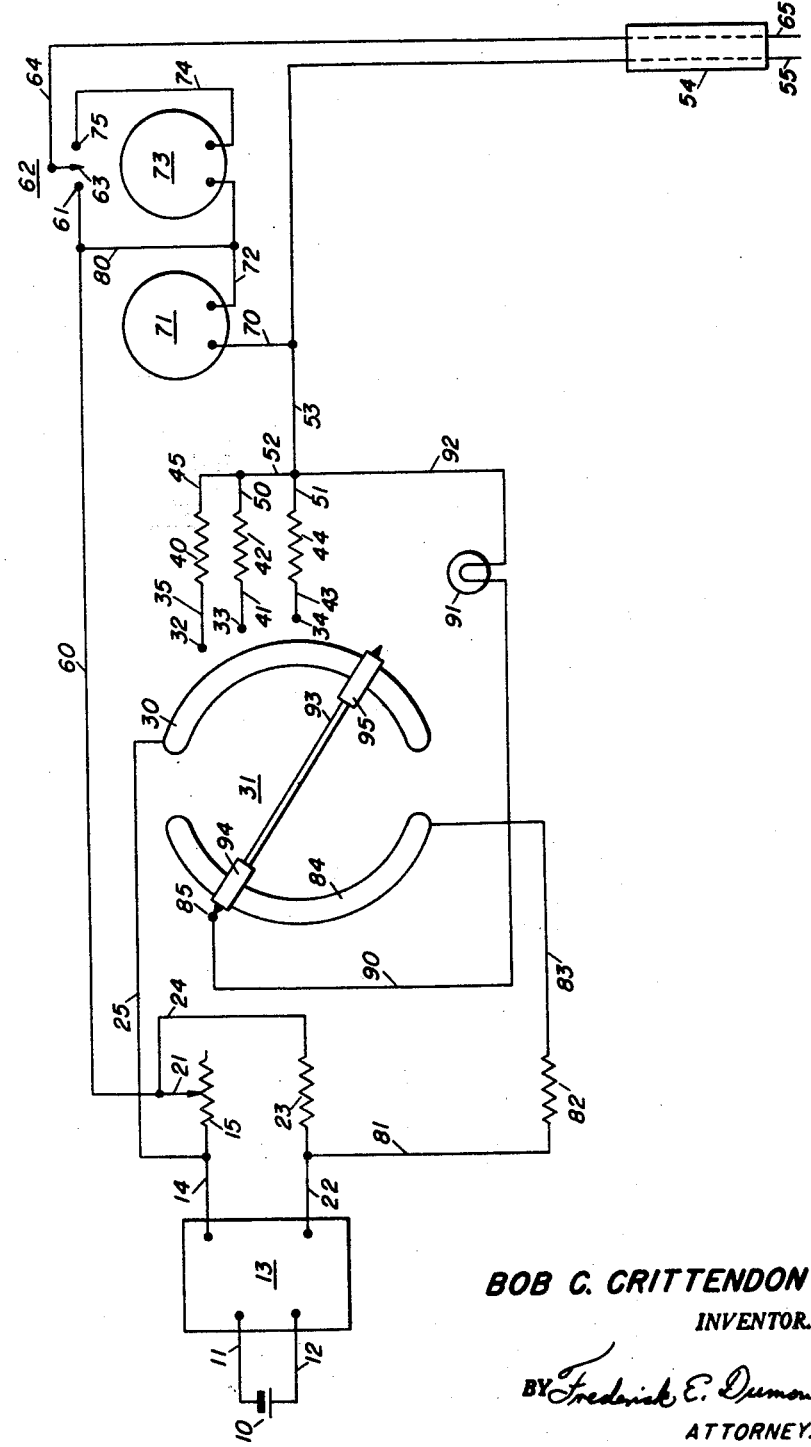
BOB C. CRITTENDON
INVENTOR.
BY Frederick E. Dumoulin
ATTORNEY.

United States Patent Office 2,859,404
Patented Nov. 4, 1958

2,859,404

DEVICE FOR MEASURING STABILITY OF WATER-IN-OIL EMULSION

Bob C. Crittendon, Midland, Tex., assignor, by mesne assignments, to Socony Mobil Oil Company, Inc., New York, N. Y., a corporation of New York Application May 23, 1955, Serial No. 510,291

6 Claims. (Cl. 324—30)

This invention relates to measuring the stability of water-in-oil emulsions and relates more particularly to a method and apparatus for measuring the stability of such water-in-oil emulsions as those employed in the drilling of wells.

In the rotary drilling of wells, such as those for petroleum oil or gas, a drilling fluid is continuously circulated from the surface of the ground to the bottom of the well bore hole and back to the surface of the ground again. The drilling fluid has various functions including those of lubricating the drill bit and pipe, carrying cuttings from the bottom of the well bore hole to the surface of the ground, and imposing a hydrostatic head on the drilled formations to prevent escape of oil, gas, or water therefrom into the well bore hole during the drilling operation. Ordinarily, aqueous drilling fluids comprising a suspension of clay in water are employed. Aqueous drilling fluids have a comparatively high specific gravity and, where reduced specific gravities are required, drilling fluids having a liquid phase consisting entirely of oil or consisting of an emulsion of oil and water can be used.

Oil-in-water emulsion drilling fluids are less expensive and more convenient to handle than drilling fluids having a liquid phase consisting entirely of oil. Therefore, of these two types of drilling fluid, the oil-in-water emulsion drilling fluids are usually preferred. On the other hand, the oil-in-water emulsion drilling fluids, in common with aqueous drilling fluids, are recognized to damage oil-producing formations by reason of filtration of water from the fluid into the formations. As a result of filtration of water, the permeability of the formation is reduced with consequent reduction in the rate at which oil is produced. To avoid the damage to the formation arising from the use of aqueous and oil-in-water emulsion drilling fluids, and yet retain the advantages of the emulsion fluids and those whose liquid phase consists entirely of oil, the use of water-in-oil emulsion drilling fluids has been proposed.

During use, the water-in-oil emulsions tend either to invert to oil-in-water emulsions in which the water, rather than the oil, is the continuous phase or to break. The tendency toward inversion or breaking can be affected by various factors but their effect will depend upon the stability, or ability to resist inversion or breaking, of the emulsion. During drilling of a well with water-in-oil emulsion drilling fluid, the stability of the emulsion may lessen almost to the point of inversion or breaking. However, the decrease in stability and approach to inversion or breaking will not necessarily be a function readily susceptible to determination such as the chemical composition of the emulsion. Further, with various water-in-oil emulsions, stability may be increased or decreased by various agents and conditions yet the effect thereof may not be ascertainable except by the time-consuming expedient of awaiting inversion or breaking.

It is an object of this invention to provide a method for determining the stability of a water-in-oil emulsion. It is another object of this invention to decrease the time required for determining the effect on the stability of a water-in-oil emulsion of changes in composition and environment. It is another object of this invention to provide apparatus for determining the stability of a water-in-oil emulsion. Further objects of the invention will become apparent from the following detailed description.

The accompanying figure is a schematic diagram of apparatus constructed in accordance with the invention.

Referring now to the figure, a source of direct electric current 10 is connected by means of conductors 11 and 12 to oscillator 13. Conductor 14 leads from oscillator 13 to potentiometer 15 having center tap 21. Also leading from oscillator 13 is conductor 22 connected to resistor 23. Connected to the other side of resistor 23 is conductor 24 which is connected to the center tap 21 of potentiometer 15. Conductor 14, potentiometer 15, conductor 24, resistor 23, and conductor 22 comprise a loop to which alternating electrical current is supplied from the oscillator 13.

Connected to conductor 14 between oscillator 13 and potentiometer 15 is conductor 25 which leads to arm 30 of selector switch 31. The arm 30 is electrically conducting. Selector switch 31 is provided with taps 32, 33, and 34. Conductor 35 connects tap 32 with resistor 40, conductor 41 conects tap 33 with resistor 42, and conductor 43 connects tap 34 with resistor 44. Each of resistors 40, 42, and 44 have different values of resistance. The resistors 40, 42, and 44 lead through conductors 45, 50, and 51, respectively, to conductor 52 connected to conductor 53. Conductor 53 leads through electrode holder 54 and is connected to electrode 55 positioned within the holder.

Leading from the center tap 21 of potentiometer 15 is conductor 60. The conductor 60 leads to tap 61 of double pole, single throw switch 62. The switch 62 is provided with arm 63 and leading therefrom is conductor 64. Conductor 64 leads through the electrode holder 54 and is connected to electrode 65 positioned within the holder.

Conductor 70 connects one side of voltmeter 71 with conductor 53. Conductor 72 connects the other side of voltmeter 71 with one side of ammeter 73. Conductor 74 connects the other side of ammeter 73 with tap 75 of switch 62. Conductor 80 connects conductor 72 with conductor 60.

Leading from conductor 22 is conductor 81 connected with resistor 82. Conductor 83 connects the other side of resistor 82 to arm 84 of selector switch 31. The arm 84 is electrically conducting. Selector switch 31 is also provided with tap 85, and this tap is connected by means of conductor 90 with lamp 91. Conductor 92 connects the lamp 91 with conductor 53.

Selector switch 31 is provided further with rotatable, non-conducting handle 93 having sliding contacts 94 and 95. Contacts 94 and 95 make electrical contact with arms 84 and 30, respectively, of the switch 31. Contact 94 is capable of contacting tap 85 and contact 95 is capable of contacting either of taps 32, 33, or 34. Thus, in one position of the handle 93, conductor 83 is connected through the arm 94 with the conductor 90. In other positions of the handle 93, the conductor 25 is connected through the arm 30 with the conductor 35, the conductor 41, or the conductor 43, respectively.

In a specific embodiment of the invention, electrodes 55 and 65 are silver strip electrodes and are spaced one-eighth inch apart. Resistors 40, 42, and 44 have a value of 100, 1,000, and 10,000 ohms, respectively. The oscillator 13 provides 60 cycle current and source 10 is such that a voltage at least as high as 250 volts can be imposed across electrodes 55 and 65.

In one manner of measuring stability of a water-in-oil emulsion, the arm 63 of switch 62 is placed in the right-hand position to connect the conductor 64 with the conductor 74 and thus place the ammeter 73 in series with the electrodes 55 and 65. The selector switch 31 is positioned such that either of the conductors 35, 41, or 43 is connected with the conductor 25 and thus either of the resistors 40, 42, or 44 is connected in series with the electrodes 55 and 65. The electrodes 55 and 65 are immersed in the water-in-oil emulsion whose stability is to be tested and the center tap 21 of potentiometer 15 is adjusted to increase the potential applied to the electrodes 55 and 65. This potential is increased until current begins to flow between the electrodes 55 and 65 as indicated by the ammeter 73.

The resistance of the water-in-oil emulsion to current flow under the voltage imposed upon the electrodes 55 and 65 is a measure of the stability of the emulsion. Depending upon the stability of the emulsion, a low potential imposed upon the electrodes will not result in current flow between the electrodes. As the potential is increased, current flow will remain absent until a critical voltage is reached at which there is an electrical breakdown of the emulsion with respect to current flow and current flow will begin. This critical voltage is a function of the stability of the emulsion and is not merely the electrical resistance of the emulsion. The critical voltage is higher with emulsions of greater stability. With the attainment of current flow as indicated by the ammeter 73, the arm 63 of the switch 62 can be placed in its left-hand position to connect voltmeter 71 in parallel with the electrodes 55 and 65. The reading on the voltmeter is indicative of the relative stability of the emulsion. With water-in-oil drilling fluids, it has been found that a voltage of about 100 volts with electrodes spaced one-eighth inch apart indicates the emulsion to be satisfactorily stable.

As stated, the resistors 40, 42, and 44 are different in value. With any particular setting of the center tap 21 of the potentiometer 15, the sensitivity of the measurement of potential imposed across the electrodes or current flow between the electrodes will increase with increasing value of the resistance in series with the electrodes. The proportion of the total potential drop due to the electrodes will decrease with increasing value of the resistance placed in series with the electrodes. Further, the amount of current flowing between the electrodes will decrease with increasing value of the resistance placed in series with the electrodes. Accordingly, with increasing value of the resistors 40, 42, or 44, a smaller potential drop across or current flow between the electrodes will occur and any change in voltage measured by the voltmeter 71 or change in current by the ammeter 73 will be due principally to the stability of the emulsion. On the other hand, a comparable change in voltage or current flow with a low value of the resistance in series with the electrodes will not have the same meaning with respect to stability of the emulsion.

The apparatus may also be conveniently used to determine whether a water-in-oil emulsion possesses a minimum desired stability. For this determination, with the electrodes 55 and 65 in the open air, i. e., with infinite resistance between them, selector switch 31 is positioned to place either of resistors 40, 42, or 44 in series with the electrodes, switch 62 is placed in its left-hand position to connect the voltmeter 71 in parallel with the electrodes, and center tap 21 of the potentiometer is adjusted until the reading on the voltmeter 71 is some desired arbitrary value, representing the minimum desired stability of the emulsion. The electrodes 55 and 65 are then placed in the emulsion. Assuming the emulsion to have a minimum stability represented by the reading on the voltmeter 71, the reading on the voltmeter will not change. However, where the stability of the emulsion is less than the stability represented by the reading on the voltmeter, the emulsion will break down electrically at this voltage, and the reading on the voltmeter will decrease. Thus, a change in the reading of the voltmeter indicates that the emulsion does not possess the desired minimum stability.

With selector switch 31 positioned such that contact 94 connects arm 84 and tap 85, resistor 82 and lamp 91 are connected in series with the electrodes 55 and 65. With the selector switch in this position and electrodes 55 and 65 immersed in the water-in-oil emulsion, lighting of the lamp indicates flow of current between the electrodes. Thus, where determination as to whether an emulsion possesses a desired minimum stability is made, as explained above, lighting of the lamp indicates that the emulsion does not possess this stability. Where stability is determined by increasing the potential imposed on the electrodes as indicated by voltmeter 71, lighting of the lamp indicates the point at which current flow through the electrodes begins.

Having thus described my invention, it will be understood that such description is given by way of illustration and example and not by way of limitation, reference for the latter purpose being had to the appended claims.

I claim:

1. Apparatus for measuring the stability of a water-in-oil emulsion comprising in combination an oscillator, means for connecting said oscillator to a source of electrical potential, means comprising a loop connected to said oscillator and containing means for varying the intensity of electrical potential produced by said oscillator, a pair of electrodes, a conductor leading from said loop to one of said electrodes, a second conductor leading from said loop to said other of said electrodes, a plurality of electrical resistors connected in parallel with each other, means for placing singularly each of said resistors in series with one of said pair of electrodes, means connected in parallel with said pair of electrodes for measuring the intensity of electrical potential imposed upon said pair of electrodes, and means for measuring flow between said pair of electrodes of electrical current.

2. In the drilling of a well bore hole in the earth wherein a drilling fluid comprising a water-in-oil emulsion is pumped from the surface of the earth through the well bore hole and back through the well bore hole to the surface of the earth, the method for measuring the stability of the water-in-oil emulsion drilling fluid comprising immersing a pair of electrodes in said emulsion, imposing upon said pair of electrodes immersed in said emulsion an increasing electrical potential until current flows through said emulsion between said pair of electrodes as a result of said imposed electrical potential, and measuring the value of said imposed electrical potential upon said pair of electrodes at which current flows through said emulsion between said pair of electrodes.

3. Apparatus for measuring the stability of a water-in-oil emulsion comprising in combination an oscillator, means for connecting said oscillator to a source of electrical potential, a variable resistor connected in parallel with said oscillator, a first switching means containing a plurality of taps, a conductor connecting said variable resistor with a first one of said taps of said first switching means, a pair of electrodes, a conductor connecting one of said electrodes with a second of said taps of said first switching means, a second switching means containing a plurality of taps, a conductor containing a resistor connecting one side of said oscillator with a first one of said taps of said second switching means, a conductor connecting the other side of said oscillator with a second one of said taps of said second switching means, a lamp, a conductor connecting one side of said lamp with a third one of said taps of said second switching means, a conductor connecting the other side of said lamp with the other one of said electrodes, three resistors having a different value of resistance, a conductor connecting one side of one of said three resistors with a fourth one of said taps of said second switching means, a conductor connecting one side of a second of said three resistors with a fifth one of said taps of said second switching means, a conductor connecting one side of a third of said resistors with a sixth one of said taps of said second switching means, a conductor connecting the other side of each of said three resistors with the other of said electrodes, means for connecting said first tap with said third tap of said second switching means, means for connecting said second tap with either of said fourth, fifth, and sixth taps of said second switching means, a voltmeter, a conductor connecting one side of said voltmeter with said other of said electrodes, a conductor connecting the other side of said voltmeter with said first one of said taps of said first switching means, an ammeter, a conductor connecting one side of said ammeter with said first one of said taps of said first switching means, a conductor connecting said other side of said ammeter with a third one of said taps of said first switching means, and means for connecting said second tap with either of said first and third taps of said first switching means.

4. The method of determining the stability of an emulsion in which the dispersed phase is water and in which the continuous phase is an electrically nonconductive organic material comprising the steps of immersing a pair of spaced electrodes in the emulsion, applying an alternating electric potential to said electrodes, and detecting for the presence of current flow between the electrodes and through the emulsion as an indication of the stable character of the emulsion.

5. The method of determining the stability of an emulsion in which the dispersed phase is water and in which the continuous phase is an electrically nonconductive organic material which comprises the steps of immersing a pair of spaced electrodes in the emulsion, applying an alternating electric potential to said electrodes, increasing the magnitude of said electric potential, detecting for the presence of current flow between the electrodes and through the emulsion, and, upon occurrence of current flow, recording the magnitude of said electric potential as a measure of the stability of the emulsion.

6. A system for determining the stability of a water-in-oil emulsion, comprising an alternating current source having an output, a pair of spaced electrodes for immersion in the emulsion, means for applying the output of said source to said electrodes, said applying means with said electrodes providing a normally open circuit, means for closing said circuit after immersion of said electrodes in the emulsion, said circuit closing means comprising a voltage varying means adjustable for varying the magnitude of voltage applied to said electrodes from said source for causing a flow of current between said electrodes through the emulsion and thereby closing said normally open circuit, a voltmeter connected across said electrodes for indicating the magnitude of voltage applied to said electrodes, at least one impedance connected in series circuit between one of said electrodes and said source, and means responsive to current flow between said electrodes and through the emulsion for indicating the closing of said normally open circuit whereby the magnitude of voltage indicated by said voltmeter is a measure of the stability of the emulsion.

References Cited in the file of this patent

UNITED STATES PATENTS

| | | |
|---|---|---|
| 1,826,247 | Heppenstall | Oct. 6, 1931 |
| 1,937,744 | Clark | Dec. 5, 1933 |
| 2,651,751 | Heath | Sept. 8, 1953 |